(12) United States Patent
Martin et al.

(10) Patent No.: US 11,352,264 B2
(45) Date of Patent: Jun. 7, 2022

(54) METHOD FOR PREPARING SYNTHETIC MINERAL PARTICLES

(71) Applicants: Centre national de la recherche scientifique, Paris (FR); UNIVERSITE PAUL SABATIER TOULOUSE III, Toulouse (FR)

(72) Inventors: François Martin, Saint Foy d'Aigrefeuille (FR); Christophe Le Roux, Avignonet-Lauragais (FR); Pierre Micoud, Peyssies (FR); Marie Claverie, Hossegor (FR); Cyril Aymonier, Begles (FR)

(73) Assignees: CENTRE NATIONAL DE LA RECHERCHE SCIENTIFIQUE, Paris (FR); UNIVERSITE PAUL SABATIER TOULOUSE III, Toulouse (FR)

( * ) Notice: Subject to any disclaimer, the term of this patent is extended or adjusted under 35 U.S.C. 154(b) by 0 days.

(21) Appl. No.: 15/764,045

(22) PCT Filed: Sep. 27, 2016

(86) PCT No.: PCT/FR2016/052453
§ 371 (c)(1),
(2) Date: Mar. 28, 2018

(87) PCT Pub. No.: WO2017/055735
PCT Pub. Date: Apr. 6, 2017

(65) Prior Publication Data
US 2018/0273389 A1   Sep. 27, 2018

(30) Foreign Application Priority Data
Sep. 28, 2015 (FR) ...................... 15 59125

(51) Int. Cl.
*C01B 33/40* (2006.01)
*C04B 33/04* (2006.01)
(Continued)

(52) U.S. Cl.
CPC .............. *C01B 33/40* (2013.01); *C04B 33/04* (2013.01); *C04B 35/443* (2013.01); *C09C 1/40* (2013.01);
(Continued)

(58) Field of Classification Search
CPC .............. C01P 2002/74; C01P 2002/82; C01P 2002/88; C01P 2002/72; C04B 2235/3201;
(Continued)

(56) References Cited

U.S. PATENT DOCUMENTS 4,812,299 A   3/1989   Wason
6,403,855 B1  6/2002   Mertens
(Continued)

FOREIGN PATENT DOCUMENTS

CN   103539146   1/2014
EP   0372132     6/1990
(Continued)

OTHER PUBLICATIONS

Ewell, Raymond H., and Herbert Insley. "Hydrothermal synthesis of kaolinite, dickite, beidellite and nontronite." Journal of Research of the National Bureau of Standards 15 (1935): 173-186. (Year: 1935).*
(Continued)

*Primary Examiner* — Anthony J Zimmer
*Assistant Examiner* — Ricardo D Morales
(74) *Attorney, Agent, or Firm* — B. Aaron Schulman, Esq.; Stites & Harbison, PLLC

(57) ABSTRACT

The invention relates to a method for preparing synthetic mineral particles with formula $(Al_yM_{1-y})_2(Si_xGe_{1-x})_2O_5$
(Continued)

(OH)$_4$, wherein M designates at least one trivalent metal selected from the group made up of gallium and the rare earths, which comprises the following steps: preparing a gel which is a precursor of said synthetic mineral particles by a co-precipitation reaction of at least one salt of metal selected among aluminium and M with at least one silicon source selected from the group made up of potassium metasilicate, sodium metasilicate, potassium metagermanate and sodium metagermanate, the molar ratio of (Al$_y$M$_{1-y}$) to (Si$_x$Ge$_{1-x}$) during the preparation of said precursor gel being equal to 1, at least one base being added during said co-precipitation reaction; and performing a solvothermal treatment of said precursor gel at a temperature of 250° C. to 600° C.

10 Claims, 6 Drawing Sheets

(51) Int. Cl.
  *C09C 1/42* (2006.01)
  *C09C 1/40* (2006.01)
  *C04B 35/443* (2006.01)
(52) U.S. Cl.
  CPC ............ *C09C 1/42* (2013.01); *C01P 2002/72* (2013.01); *C01P 2002/74* (2013.01); *C01P 2002/82* (2013.01); *C01P 2002/88* (2013.01); *C04B 2235/3201* (2013.01); *C04B 2235/349* (2013.01); *C04B 2235/3427* (2013.01); *C09C 1/405* (2013.01)
(58) Field of Classification Search
  CPC ...... C04B 2235/3427; C04B 2235/349; C04B 35/443; C04B 33/04; C09C 1/405; C09C 1/42; C09C 1/40; C01B 33/40
  See application file for complete search history.

(56) References Cited

U.S. PATENT DOCUMENTS

| | | | |
|---|---|---|---|
| 8,444,946 | B2 | 5/2013 | Martin et al. |
| 9,714,174 | B2 | 7/2017 | Rimer et al. |
| 10,421,666 | B2 | 9/2019 | Rimer et al. |
| 2006/0147367 | A1 | 7/2006 | Temperly et al. |
| 2009/0261294 | A1 | 10/2009 | Martin et al. |
| 2013/0343980 | A1* | 12/2013 | Le Roux ................ C01B 33/38 423/331 |
| 2014/0050659 | A1 | 2/2014 | Rimer et al. |
| 2014/0256866 | A1* | 9/2014 | McGuire ................ C09D 7/61 524/450 |
| 2017/0369327 | A1 | 12/2017 | Rimer et al. |

FOREIGN PATENT DOCUMENTS

| | | |
|---|---|---|
| JP | H05170426 | 7/1993 |
| JP | 1993-170426 | 9/1994 |
| JP | H-06345419 | 12/1994 |
| WO | WO-2005/102929 | 11/2005 |

OTHER PUBLICATIONS

Ewell et al. ("Hydrothermal synthesis of kaolinite, dickite, beidellite and nontronite." Journal of Research of the National Bureau of Standards 15 (1935): 173-186.) (Year: 1935).*
Hellstern et al. ("Development of a dual-stage continuous flow reactor for hydrothermal synthesis of hybrid nanoparticles." Industrial & Engineering Chemistry Research 54.34 (2015): 8500-8508.) (Year: 2015).*
Posey-Dowty, J., et al. "Kinetics of mineral-water reactions; theory, design and application of circulating hydrothermal equipment." American Mineralogist 71.1-2 (1986): 85-94. (Year: 1986).*
S. Petit et al: "Hydrothermal (200° C), Synthesis and Crystal Chemistry of Iron-Rich Kaolinites", Clay Minerals, vol. 25, No. 2, Jan. 1, 1990(Jan. 1, 1990), pp. 181-196, XP055287658, GB ISSN: 0009-8558, DOI: 10.1180/claymin.1990.025.04 p. 182 figure 3 table 2.
M. C. Van Oosterwyck-Gastuche: "Kaolinite Synthesis. II. A Review and Discussion of the Factors Influencing the Rate Process", Clays and Clay Minerals, vol. 26, No. 6, Jan. 1, 1978(Jan. 1, 1978), pp. 409-417, XP055287662, US ISSN: 0009-8604, DOI: 10.1346/CCMIN.1978.0260604 tables 1,2.
International Search Report for PCT/FR2016/052453, dated Dec. 9, 2016.
Written Opinion of the International Searching Authority for PCT/FR2016/052453, dated Dec. 9, 2016.
RRI—Rapport de Recherche International (International Search Report) for PCT/FR2016/052453, dated Dec. 9, 2016.
Akiyama, et al., "Formation Process of Kaolinite under Hydrothermal Condition", 1999, pp. 433-436, vol. 107, No. 5, Journal of the Ceramic Society of Japan.
Young-Nam Jang, "Hydrothermal Synthesis of Kaolinite", Sep. 2007, pp. 147-153, vol. 20, No. 3, J. Miner. Soc. Korea.
Sun, Shuhong, et al, Apr. 2007, vol. 21, No. 1, Journal of Molecular Catalysis (China).

* cited by examiner

METHOD FOR PREPARING SYNTHETIC MINERAL PARTICLES

The invention concerns a method for preparing synthetic mineral particles and a composition obtainable by this method.

Numerous minerals, such as borates or silicates, are used in various industrial fields. The kaolinites, for example, are used in particle form as mineral fillers in numerous areas of industry, such as: papermaking, polymers, cosmetics, paint, as well as varnish. Kaolinites are also used as a base material in ceramics.

Kaolinites belong to the family of the phyllosilicates. The phyllosilicates (lamellar silicates) consist of a regular stack of elementary sheets that are crystalline in structure, the number of which varies from a few units to several thousand units. Amongst the phyllosilicates, the group that includes, inter alia, kaolinite and serpentine is characterised by the fact that each elementary sheet is formed by the association of a layer of tetrahedrons and a layer of octahedrons. The octahedral layer in 1:1 phyllosilicates is formed by a plane of $O^{2-}$ and $OH^-$ ions (in a molar ratio of 1/1 $O^{2-}/OH^-$). Each tetrahedral layer forms a two-dimensional network of tetrahedrons, one of the apices of which is occupied by an oxygen from the octahedral layer, whilst the three others are occupied by substantially coplanar oxygens.

This group corresponds to the 1:1 phyllosilicates. Given their structure, 1:1 phyllosilicates are also referred to as "TO" (tetrahedron-octahedron). Unlike smectites, kaolinites are considered non-inflating, and are characterised by the absence of water molecules and cations in the interfoliaceous spaces (spaces between each elementary sheet), as water molecules, in particular, give a mineral an inflating property.

In nature, kaolinite is always associated with numerous other compounds such as quartz, as well as iron oxides and hydroxides. Kaolin indicates the association of kaolinite with these other compounds that may be present in varying proportions. Amongst other things, natural kaolinite contains chemical elements such as nickel or iron in its crystalline network, as well as adsorbed chemical elements such as uranium or arsenic.

The methods for purifying kaolin into kaolinite are time-consuming, expensive, and complex. Moreover, they never allow for kaolinites in the true sense of the word to be obtained. Nor do they make it possible to obtain a product free of any other chemical element, e.g. nickel, in its crystalline network. Furthermore, the purification methods for kaolin do not allow for the elimination of adsorbed chemical elements such as uranium or arsenic.

Methods for synthesizing kaolinite that allow the control of the chemical composition of the prepared particles are known in the art.

The scientific publication entitled 'Influence du pH, du matériau de depart et de la durée de synthèse sur la cristallinité de la kaolinite' (Fialips et al, C.R. Acad. Sci. Paris, Sciences de la Terre et des planètes 1999, vol 328, pp 515-520), for example, describes a method for preparing kaolinite by hydrothermal treatment of an amorphous gel at 220° C. for 35 to 182 days.

JP H05 170426 describes a method for synthesising kaolinite starting from a sodium silicate solution and an aluminium sulphate solution, in which hydrothermal treatment over at least five days is necessary in order to obtain kaolinite.

The scientific publication entitled 'Hydrothermal (200° C.) synthesis and crystal chemistry of iron-rich kaolinites' (S. Petit et al., Clay Minerais, vol. 25, no. 2, Jan. 1, 1990, pp. 181-196) describes a method of hydrothermal synthesis of iron-rich kaolinites, in which the aluminium is replaced by iron. The hydrothermal treatment is carried out at 200° C. over 7 to 36 days.

ES 2 242 532 describes a method for the hydrothermal synthesis of kaolinites containing iron in lieu of aluminium. The hydrothermal treatment is carried out in a closed reactor between 175 and 225° C. for 60 days.

The scientific publication entitled 'Kaolinites synthesis. II. A review and discussion of the factors influencing the rate process' (M. C. Van Oosterwyck-Gastuche et al., Clays and Clay Minerals, vol. 26, no. 6, Jan. 1, 1978, pp. 409-417) describes a study of the factors influencing the performance of kaolinite synthesis.

However, the known methods require excessive time or temperatures that are not compatible with industrial-scale production.

The invention thus seeks to propose a method for preparing synthetic mineral particles having a structure corresponding to that of a kaolinite that addresses the disadvantages of the known synthesis methods.

The invention further seeks to propose a method for preparing synthetic mineral particles having a structure corresponding to that of a kaolinite that can be executed simply and rapidly and is compatible with the constraints of operation on an industrial scale.

The invention seeks to propose a method for preparing synthetic mineral particles of high purity that are lamellar, have fine granulometry—in particular, an average particle size between 2 nm and 600 nm—that are precisely controllable and weakly dispersed, and have a crystalline structure identical or nearly identical to that of the natural minerals, in particular natural phyllosilicates and natural kaolinite.

The invention further seeks, in particular, to propose a method allowing for the preparation of synthetic compounds that can be used instead of natural kaolins in various applications thereof.

To this end, the invention concerns a method for preparing synthetic mineral particles having the following formula (I):

$$(Al_yM_{1-y})_2(Si_xGe_{1-x})_2O_5(OH)_4 \quad (I)$$

in which
Al indicates aluminium,
Si indicates silicon,
M indicates at least one trivalent metal selected from the group of gallium and the rare earth elements,
y is a real number between 0 and 1,
Ge indicates germanium,
x is a real number between 0 and 1,
O indicates oxygen, and
H indicates hydrogen,
method wherein:
a precursor gel of the synthetic mineral particles of formula (I) is prepared by means of a co-precipitation reaction between:
at least one salt of a metal selected from the group of aluminium and M,
at least one source of at least one chemical element selected from the group of silicon and germanium, the source of the chemical element selected from the group of silicon and germanium being selected from the group consisting of potassium metasilicate, sodium metasilicate, potassium metagermanate, and sodium metagermanate,
the molar ratio of $(Al_yM_{1-y})/(Si_xGe_{1-x})$ over the course of the preparation of the precursor gel being equal to 1, at least one base being added over the course of the co-precipitation reaction, the precursor gel is subjected to continuous solvothermal treatment at a temperature between 250 and 600° C. for a period selected so as to allow synthetic mineral particles of formula (I) to be obtained.

In fact, the inventors have surprisingly found that, by combining the aforementioned reagents and maintaining the stoichiometric proportions of the compound of formula (I) with regard to the molar ratio between aluminium and/or M and silicon and/or germanium $(Al_yM_{1-y})/(Si_xGe_{1-x})$, a precursor gel is obtained that allows synthetic mineral particles of formula (I) to be obtained following continuous solvothermal treatment. The simplicity of this method is even more surprising given that it allows a non-inflating synthetic mineral to be obtained, rather than an inflating synthetic material having a structure similar to that of the smectite family. In fact, the synthesis of a non-inflating synthetic mineral such as a kaolinite normally requires very long periods of solvothermal treatment (in particular periods of hydrothermal treatment) or very elevated pressures and temperatures in order to reduce the duration of the hydrothermal treatment, whilst it is much easier to prepare phyllosilicates that are inflating. Quite surprisingly, carrying out continuous solvothermal treatment allows such kaolinites to be prepared and has the additional advantage of reducing the time required for synthesis.

Furthermore, the precursor gel need not be dried before carrying out the solvothermal treatment. However, drying is not ruled out if one should wish to use or preserve the precursor gel in the form of a powder. In particular, advantageously and according to the invention, the solvothermal treatment of the precursor gel is carried out without prior drying of the precursor gel prepared.

Furthermore, the inventors have found that a method according to the invention allows synthetic mineral particles of formula (I) to be obtained having very fine granulometry (average diameter less than 600 nm, in particular between 20 nm and 600 nm, in particular between 20 nm and 500 nm) combined with a narrow particle size distribution.

Throughout, the term 'non-inflating' refers to all phyllosilicates or mineral particles having a diffraction line (001) that is not affected by contact with ethylene glycol or glycol, i.e., their interatomic distance corresponding to the (X-ray) diffraction line (001) does not increase after the phyllosilicate has been placed in contact with ethylene glycol or glycol.

Additionally, advantageously, the synthetic mineral particles obtained by a method according to the invention (or synthetic kaolinite according to the invention) do not inflate in the presence of ethylene glycol or glycol. The synthetic kaolinites obtained by a method according to the invention are thus non-inflating, as are natural kaolinites, and have no electrical charge.

Kaolinites are also characterised by a high degree of thermal stability. The synthetic mineral particles obtained by a method according to the invention also have a high degree of thermal stability, in particular up to 400° C. In particular, a synthetic kaolinite according to the invention is advantageously thermally stable up to 450° C. (in particular in air).

Advantageously, in X-ray diffraction, the synthetic mineral particles obtained by a method according to the invention have at least one diffraction line characteristic of a plane (001) situated at a distance of 7.00 to 7.30 Å, in particular between 7.00 and 7.20 Å.

Advantageously, in an infrared medium, the synthetic mineral particles obtained by a method according to the invention have four vibration bands between 3610 and 3700 $cm^{-1}$ that are representative of elongation vibrations of hydroxyl (—OH) groups.

All these characteristics and properties of the synthetic mineral particles obtained by a method according to the invention, in particular the presence of a diffraction line characteristic of a plane (001) situated at a distance between 7.00 and 7.30 Å, in particular one preserved after heating (in particular after heating to 400° C., e.g., for 1 to 6 h), their lack of inflation, in particular in ethylene glycol or glycol, as well as the thermal stability of these compounds show that they have physical and structural properties corresponding to those of the kaolinite group.

Any reagent containing aluminium, gallium, or a rare-earth metal that allows for the preparation of synthetic mineral particles of formula (I) (in particular any reagent that can be solubilised in a solvent, e.g. water or an alcohol) may be used as a source of aluminium or the metal M in a method according to the invention. In particular, according to the invention, the aluminium salt is advantageously selected from the group consisting of aluminium sulphate, aluminium nitrate, aluminium chloride, and aluminium phosphate. More specifically, according to the invention, the aluminium salt is advantageously selected from the group consisting of aluminium chloride and aluminium nitrate.

In one advantageous embodiment of the invention, M refers to at least one trivalent metal (i.e. having at least an oxidation state of 3) selected from the group consisting of iron, gallium, and the rare earths elements. In particular, in an embodiment of a method according to the invention, in which M comprises iron, the solvothermal treatment is carried out continuously over a period of less than 12 h, in particular less than 6 h.

More specifically, according to the invention, M advantageously refers to at least one metal having the formula $Ga_{z(1)}Sc_{z(2)}Y_{z(3)}La_{z(4)}Ce_{z(5)}\ Pr_{z(6)}Nd_{z(7)}Pm_{z(8)}Sm_{z(9)}Eu_{z(10)}$ $Gd_{z(11)}Tb_{z(12)}\ Dy_{z(13)}HO_{z(14)}Er_{z(15)}Tm_{z(16)}Yb_{z(17)}Lu_{z(18)}$; wherein each z(i) represents a real number in the range of 0 to 1, such that $\Sigma_{i=1}^{18} z(i)=1$.

Throughout, 'rare earths elements' refers to the metals selected from the group consisting of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

According to the invention, advantageously, a base, in particular a strong base, is added over the course of the co-precipitation reaction of said precursor gel. More specifically, according to the invention, a base selected from the group consisting of NaOH (soda) and KOH (potash) is advantageously added during the co-precipitation reaction of the precursor gel.

The solvothermal treatment is carried out for a period that allows synthetic mineral particles of formula (I) to be obtained. The duration of the solvothermal treatment is selected depending on the temperature and pressure over the course of the solvothermal treatment, as well as the conditions in which it is carried out (batch, continuous, etc.), and possibly the nature of any solvent used. In particular, synthetic mineral particles of formula (I) may be obtained after a few minutes, or even a few seconds, of solvothermal treatment. For example, the duration of the solvothermal treatment is greater than 10 seconds and less than 6 hours, e.g., less than 1 hour in the case of continuous preparation. In particular, according to the invention, the solvothermal treatment is advantageously carried out over a period of less than 48 hours, in particular less than 24 hours. More specifically, according to the invention, the solvothermal treatment is advantageously carried out over a period of less than 20 hours, in particular less than 18 hours, e.g., less than 12 hours.

The solvothermal treatment may be carried out in a sealed reactor (e.g., autoclave) or in a continuous manner. In a particularly advantageous embodiment of a method according to the invention, the solvothermal treatment is carried out continuously, in particular using a continuous reactor. Any known continuous reactor may be used in a method according to the invention. Thus, according to the invention, the continuous reactor is advantageously a constant-volume continuous reactor. In a particularly advantageous embodiment of the method according to the invention, a continuous reactor selected from the group consisting of piston-flow reactors is used. They may be tubular reactors in which the reaction medium flows in a laminar, turbulent, or intermediate fashion. It is additionally possible to use any continuous co-current or countercurrent reactor regarding the insertion and contacting of the various compositions and/or liquid media that are contacted in a method according to the invention.

The solvothermal treatment is carried out in a reaction medium comprising said precursor gel in a solvothermal treatment area of the reactor at a temperature suited to allow said synthetic particles to be obtained, depending, in particular, on the pressure and the duration of the solvothermal treatment. According to the invention, the solvothermal treatment is advantageously carried out at a temperature between 280° C. and 600° C., in particular between 280° C. and 500° C., and more specifically at a temperature between 280° C. and 450° C. More specifically, according to the invention, the solvothermal treatment is advantageously carried out at a temperature between 290° C. and 420° C., in particular between 290° C. and 400° C., and in particular between 295° C. and 375° C.

The solvothermal treatment is carried out in a reaction medium comprising said precursor gel in a solvothermal treatment area of the reactor at a pressure suited to allow the synthetic particles to be obtained, depending, in particular, on the pressure and the temperature of the solvothermal treatment. According to the invention, the solvothermal treatment is advantageously carried out at a pressure greater than 1 MPa. More specifically, according to the invention, the solvothermal treatment is advantageously carried out at a pressure between 2 MPa and 50 MPa, in particular between 8 MPa and 40 MPa, and in particular between 22 MPa and 30 MPa. This refers in particular to the saturation vapour pressure at the temperature at which the solvothermal treatment is carried out, in the event that the solvent is water.

In a particularly advantageous embodiment of a method according to the invention, the solvothermal treatment is carried out in an aqueous medium. In this case, the treatment is a hydrothermal treatment. Water may be used as the only solvent or diluent, or in a mixture with any other fluid.

According to the invention, it is advantageously possible to use the following formula (II) as the chemical formula for the precursor gel:

$$2Al2(Si_xGe_{1-x})(5-\varepsilon)O(4+2\varepsilon)OH \quad (II),$$

in which ε is a real number of the interval [0; 5[.

Another chemical formula is sometimes also used to define said precursor gel, i.e., the following formula: $Al_2(Si_xGe_{1-x})_2O_7$, or regarding a precursor gel for the preparation of a synthetic kaolinite where x=1: $Al_2Si_2O_7$.

The invention further concerns a composition obtainable by a method according to the invention.

Thus, the invention also concerns a composition comprising synthetic mineral particles of the following formula (I):

$$(Al_yM_{1-y})_2(Si_xGe_{1-x})_2O_5(OH)_4 \quad (I)$$

in which:
Al indicates aluminium,
Si indicates silicon,
M indicates at least one trivalent metal selected from the group of gallium and the rare earths elements,
y is a real number between 0 and 1,
Ge indicates germanium,
x is a real number between 0 and 1,
O indicates oxygen, and
H indicates hydrogen,
characterised in that the synthetic mineral particles of formula (I) have an average size between 20 nm and 600 nm, as observed by electron microscopy.

In fact, the inventors have found that a composition according to the invention (obtainable by a method according to the invention) has the advantage of comprising synthetic mineral particles with an average particle size in the nanometre range.

Furthermore, according to the invention, the synthetic mineral particles advantageously have a monodispersed particle size distribution, i.e., a narrow particle size distribution (in contrast to a mixture of particles of widely varying sizes).

Throughout, the 'thickness' of the particles refers to the smallest dimension of the particles, i.e., the dimension of the particles in the direction c of the crystalline network of the particles.

Throughout, the 'greatest dimension' of the particles refers to the greatest of the dimensions of the particles on the plane (a, b) of the crystalline network of the particles.

The thickness and the greatest dimension of the particles are measured by scanning electron microscopy (SEM) or transmission electron microscopy (TEM).

According to the invention, the synthetic mineral particles of formula (I) advantageously have a thickness between 1 and 50 nm, in particular between 2 and 30 nm, e.g., on the order of 10 nm. According to the invention, the greatest dimension of the synthetic kaolinite particles is advantageously between 10 and 600 nm, in particular between 20 and 500 nm, and more specifically between 20 and 300 nm.

Advantageously, in X-ray diffraction, a composition according to the invention has at least one diffraction line characteristic of a plane (001) situated at a distance of 7.00 to 7.30 Å, in particular between 7.00 and 7.20 Å. Such a diffraction line is characteristic of kaolinites, and its preservation following heating (or anhydrous heat treatment) up to 400 to 450° C. shows that the synthetic mineral particles of a composition according to the invention have physical and structural properties that are quite similar to those of natural kaolinites.

Advantageously, according to the invention, said synthetic mineral particles of formula (I) are organised in a solid structure consisting of sheets stacked upon one another. In particular, each elementary sheet consists of a tetrahedral layer, the centre of each tetrahedron being occupied by a silicon (or germanium) atom, an octahedral layer, the centre of each octahedron being occupied by an aluminium atom, and an interfoliaceous space.

Where, in the formula (I) of a composition according to the invention, x is equal to 1, i.e., there is only silicon in tetrahedral sites and only aluminium in octahedral sites, the synthetic mineral particles have the following formula (III):

$$Al_2Si_2O_5(OH)_4 \qquad (III).$$

The invention also concerns a method and a composition, both characterised by some or all of the characteristics set forth above or below.

Other objectives, characteristics, and advantages of the invention will become apparent upon a reading of the following description of one of its preferred embodiments, which is provided by means of example and without limitation, and by reference to the attached drawings, in which.

A. GENERAL PROTOCOL FOR A PREPARATION METHOD ACCORDING TO THE INVENTION

Figure 1:
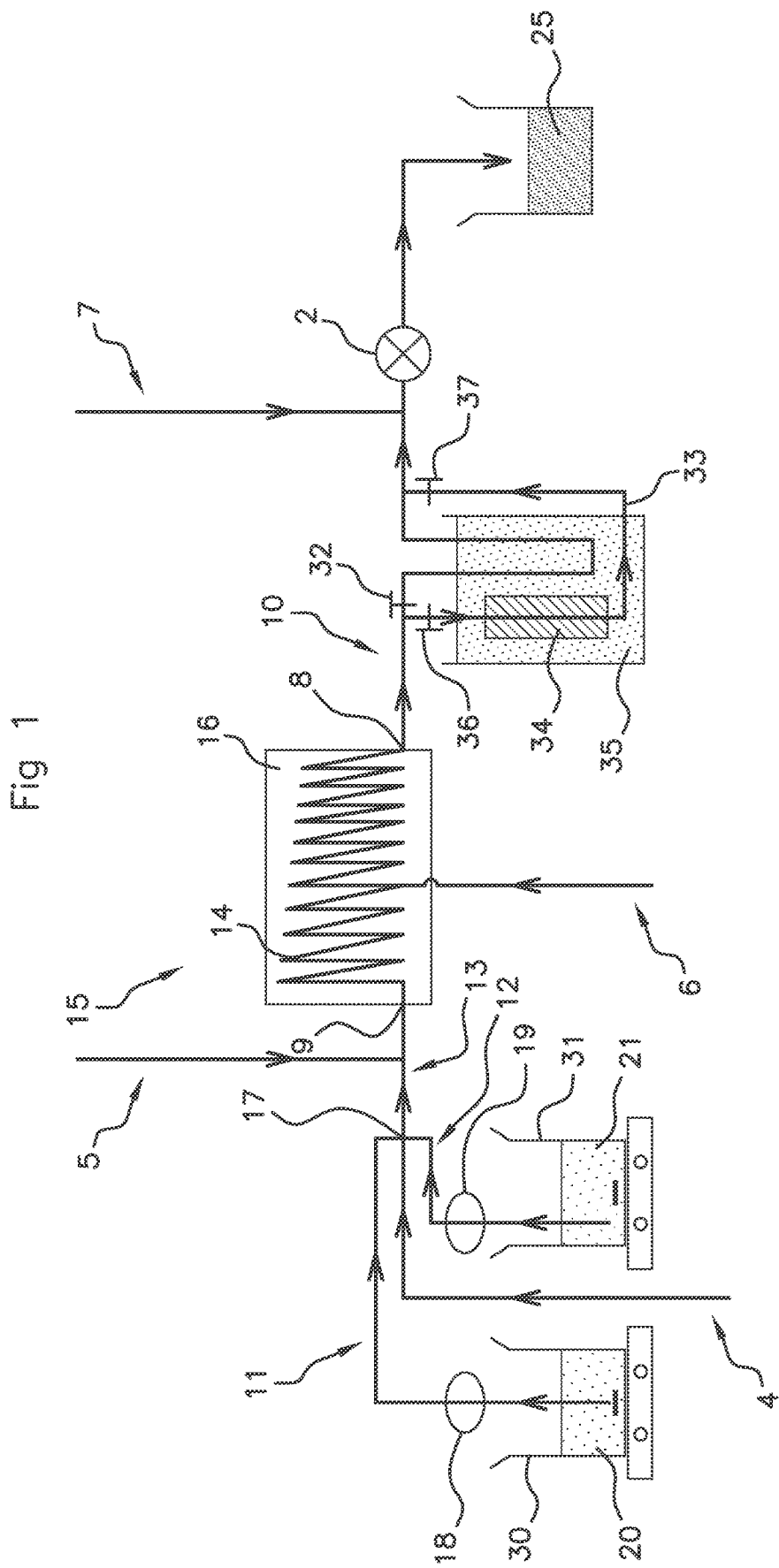
FIG. 1 is a schematic view of a device allowing the execution of a method according to the invention in which the solvothermal treatment is carried out continuously.

1. Preparation of a Precursor Gel for a Synthetic Kaolinite of Formula (I) According to the Invention The precursor gel of the synthetic mineral particles of formula (I) may be prepared by a co-precipitation reaction having as a reagent at least one source of silicon and/or at least one source of germanium, selected from the group consisting of potassium metasilicate, potassium metagermanate, sodium metasilicate, and sodium metagermanate, and at least one aluminium salt and/or a metal salt of a metal M such as aluminium sulphate or aluminium nitrate.

This co-precipitation reaction allows a precursor gel having the stoichiometry of a synthetic kaolinite corresponding to formula (I) according to the invention to be obtained.

The precursor gel is prepared by a co-precipitation reaction starting from:

1. An aqueous solution of potassium or sodium metasilicate or an aqueous potassium or sodium metagermanate solution, or a mixture of such solutions in the molar ratio $x/(1-x)$;
2. A basic solution, in particular of sodium hydroxide or potassium hydroxide, and
3. An aqueous solution in which at least one aluminium salt and/or one salt of a metal M, e.g., an aqueous aluminium nitrate solution $(Al(NO_3)_3)$ is dissolved.

The molar ratio of $(Al_yM_{1-y})/(Si_xGe_{1-x})$ over the course of the preparation of the precursor gel is substantially equal to 1.

The basic solution may be prepared, e.g., by dissolving sodium hydroxide in water, or using any compound suitable to generate at least one of sodium hydroxide or potassium hydroxide by reacting with the solvent to which said compound is added or in which the solvothermal treatment will be carried out. Sodium or potassium hydroxide may be generated in part, e.g., by adding an alkaline alcoholate to the solvothermal treatment medium such as sodium ethylate or potassium ethylate (the hydrolysis of which allows the formation of sodium hydroxide or potassium hydroxide and ethanol).

This precursor gel is prepared in accordance with the following protocol:

1. The aqueous metasilicate and/or metagermanate solution is mixed with the basic solution,
2. The solution in which the aluminium and/or M salt is dissolved is then added; the precursor gel forms instantaneously.

The inventors' measurements show that the pH in the resultant solution comprising the precursor gel is between 4 and 5.5.

The resultant solution comprising the precursor gel may (or may not) be agitated at room temperature (RT) (e.g., 22.5° C.) for 5 to 30 min.

The resultant precursor gel is subjected to several cycles of washing and centrifugation.

For example, the precursor gel may be recovered following centrifugation (e.g., between 3000 and 15,000 RPM for 5 to 60 min) and elimination of the supernatant (e.g., potassium or sodium nitrate) and washing in demineralised water (e.g., three successive washes and centrifugations).

The washed precursor gel is then subjected to solvothermal treatment in the form obtained following the final centrifugation or possibly after having been dried (e.g., in a proofer or by lyophilisation). In particular, there is no need to dry the mineral particles contained in the precursor gel thus obtained. Drying may, however, be carried out if the solvothermal treatment is not carried out rapidly following the preparation of the precursor gel and it is preferred to preserve it in powder form.

2. Solvothermal Treatment of the Precursor Gel for a Synthetic Kaolinite of Formula (I) According to the Invention The precursor gel obtained above is subjected to solvothermal treatment at a temperature between 250 and 600° C., in particular a temperature between 280 and 500° C., and in particular a temperature between 280 and 450° C.

In a first embodiment of a method according to the invention, the solvothermal treatment of the precursor gel is carried out in a closed reactor.

To this end, the precursor gel obtained following precipitation is placed in a reactor/autoclave placed inside a furnace or proofer at a predetermined reaction temperature (between 250 and 600° C.) for the entire duration of the solvothermal treatment.

If necessary, the liquid/solid ratio is adjusted in advance to a value between 2 and 80, in particular between 5 and 50 (the amount of liquid being expressed in cm3 and the amount of solid in grams, and indicating solely the amount of dry hydrogel).

The composition resulting from the solvothermal treatment has a crystallinity observable by X-ray diffraction, which increases with the duration of the solvothermal treatment and reflected in the corresponding diffractograms by the rapid appearance of characteristic lines that narrow and intensify rapidly over the course of the treatment.

Following this solvothermal treatment, a composition comprising synthetic kaolinite mineral particles according to formula (I) according to the invention is obtained in suspension in a solution, in particular an aqueous solution. At the end of this solvothermal treatment, the composition contained in the reactor may be recovered by centrifugation (between 3000 and 15,000 RPM, for 5 to 60 min), followed by elimination of the supernatant, or stored in the form of a suspension.

The composition comprising mineral particles that is recovered following the final centrifugation may then be dried:

in a proofer at a temperature between 60 and 130° C. for 1 to 24 h, or by lyophilisation, e.g., in a CHRIST ALPHA® 1-2 LD Plus freeze-dryer for 48 to 72 h, or by atomisation.

In a second embodiment of a method according to the invention, the solvothermal treatment of the precursor gel is carried out continuously. Such a continuous solvothermal treatment has the advantage that the duration of the solvothermal treatment is further reduced; for example, a duration of less than 6 h, in particular less than 2 h, is sufficient.

In a method according to the invention in which the solvothermal treatment is carried out continuously, a reactor 15 for continuous preparation of mineral particles of a compound according to the invention (as shown in FIG. 1) is used, comprising:

A first duct portion 11 in which a first aqueous potassium or sodium metasilicate solution 20 or an aqueous potassium or sodium metagermanate solution, or a mixture of these solutions, as well as a basic solution, is added;

A second duct portion 12 in which a second aqueous solution 21, into which at least one aluminium salt and/or one salt of at least one metal M is dissolved, is added;

A third duct portion 13 arranged after the first duct portion 11 and the second duct portion 12 and extending up to an inlet 9 of a reaction enclosure 16, with the first duct portion 11 and the second duct portion 12 joining at a point 17 at which the third duct portion 13 begins;

A reaction duct 14 extending from the inlet 9 in the reaction enclosure 16 and after the third duct portion 13.

A peristaltic pump 18 allows for continuous pressurised supply of the first duct portion 11 with the first aqueous solution 20, which is contained in a reservoir 30 that is agitated. A second peristaltic pump 19 allows for continuous pressurised supply of the second duct portion 12 with the second aqueous solution 21, which is contained in a reservoir 31 that is agitated.

In order to control the temperature within the reaction duct 14, the reaction enclosure 16 is a furnace comprising a heating mantle, which comprises ceramic resistors. The reaction duct 14 is generally serpentine-shaped having multiple loops inside the heating mantle until it exits the latter via an outlet 8, which constitutes the outlet of the reaction enclosure 16.

The mixture within the third duct portion 13 is near room temperature. The third duct portion 13 is optional, and the point 17 and the inlet 9 can be combined. In the embodiment shown in FIG. 1, the third duct portion 13 has, e.g., a length between 10 and 20 cm.

The total residence time in the device for preparing synthetic mineral particles by a method according to the invention is less than 30 min, in particular less than 15 min, or even less than 5 min or on the order of 1 min.

Furthermore, it is possible to introduce other solutions, and, in particular, to adjust the amount of solvent to different levels of the device, e.g., using inlets 4, 5 located before the solvothermal treatment area, the inlet 4 being located before the point 17, the inlet 6 being located at the level of the solvothermal treatment area, the inlet 7 being located after the solvothermal treatment area and before the outlet for the resultant suspension.

A pressure regulator 2 is arranged downstream of the reaction enclosure 16 and connected with a fifth duct portion 10 that extends from the outlet 8 of the reaction duct 14 and the reaction enclosure 16 up to a receptacle 25 in which a suspension comprising the mineral particles obtained is recovered.

By closing a valve 32 interposed on the fifth duct portion 10, the resultant suspension obtained at the outlet 8 of the reaction duct 14 can be circulated in a branched circuit 33, which allows this suspension to pass through a porous fritted filter 34 suited to retain the particles and allow for their recovery. The porous fritted filter 34 is plunged into an ice bath 35, allowing the suspension leaving the reactor to be cooled. In this case, valves 36 and 37 arranged on the branched circuit 33 are open. The porous fritted filter 34 is selected so as to retain the synthesised mineral particles by separating them from the liquid medium in which they are transported. The filter is made, e.g., of 316 L stainless steel and has a pore size of 50 µm. When the porous fritted filter 34 is clogged with mineral particles, it is sufficient to open the valve 32 and close the valves 36 and 37 in order to directly recover the suspension in the recipient 25, this suspension being cooled by passing through the ice bath 35, then washed and centrifuged several times in order to recover the mineral particles that may then be dried, e.g., in a proofer. In another variant (not shown), it is certainly also possible to provide several fritted filters in parallel, which allows the resultant suspension to be directed at the outlet of the reaction duct 14 towards another fritted filter once the previous filter has been clogged by the mineral particles.

In one variant, if a solution comprising the precursor gel is first prepared, a single duct portion replaces the first duct portion 11 and the second duct portion 12.

In any case, it is important to control the dilution of the precursor gel that is introduced into each duct portion and in the reaction duct 14 so as to allow for continuous circulation of the reaction medium in the reaction duct 14 and in all of the ducts supplying said precursor gel composition to the inlet 9 of the reaction enclosure 16. The concentration of the precursor gel in the precursor gel composition introduced into the inlet of the reaction enclosure 16 is advantageously between $10^{-3}$ mol/L and several mol/L, e.g., on the order of 0.01 mol/L. It should be noted that this concentration is much lower than the concentrations used in prior-art methods for preparing synthetic mineral particles such as phyllosilicates.

The solvothermal treatment carried out in the reaction duct 14 is a solvothermal treatment that may, in particular, be carried out under supercritical or subcritical conditions, in particular homogeneous subcritical conditions. Thus, the temperature and pressure at which the solvothermal treatment is carried out can be selected such that the precursor gel composition introduced into the inlet of the reactor, and in particular the solvent(s) it comprises, is/are in supercritical conditions or homogeneous subcritical conditions, i.e., above the liquid-gas equilibrium curve of the solvent, and such that the solvent is in the liquid state and not in the form of a liquid-gas mixture or in purely gaseous form.

Following this solvothermal treatment, a suspension comprising mineral particles in solution, in particular aqueous solution, is obtained. Upon completion of this solvothermal treatment, the suspension obtained is recovered by filtration, e.g., using a fritted ceramic filter, or by centrifugation (between 3000 and 15,000 RPM for 5 to 60 min), followed by elimination of the supernatant.

The recovered composition, comprising synthetic mineral particles of formula (I), may be washed with water, in particular with distilled or reverse-osmosis-purified water, e.g., by carrying out one or two cycles of washing/centrifugation.

The composition comprising synthetic mineral particles of formula (I) that is recovered following the final centrifugation may then be dried:
  in a proofer at a temperature between 60 and 130° C. for 1 to 24 h, or
  by lyophilisation, e.g., in a CHRIST ALPHA® 1-2 LD Plus freeze-dryer for 48 to 72 h,
  by microwave irradiation,
  by atomization,
  or by any other powder drying technique.

The inventers have thus found that not only is an extremely short solvothermal treatment time (less than 1 min) in supercritical conditions sufficient to allow conversion of the initial gel into a crystallised, thermally stable material, but also that the synthetic mineral particles obtained have a crystallinity comparable to that of natural kaolinites.

The synthetic mineral particles of formula (I) contained in a composition obtained by a method according to the invention have remarkable properties in terms of purity, crystallinity, and thermal stability despite a solvothermal treatment time that is significantly reduced compared to the times that are normally necessary in known-art methods.

B. ANALYSIS AND STRUCTURAL CHARACTERISATION

1. X-Ray Diffraction Analyses

Figure 2:
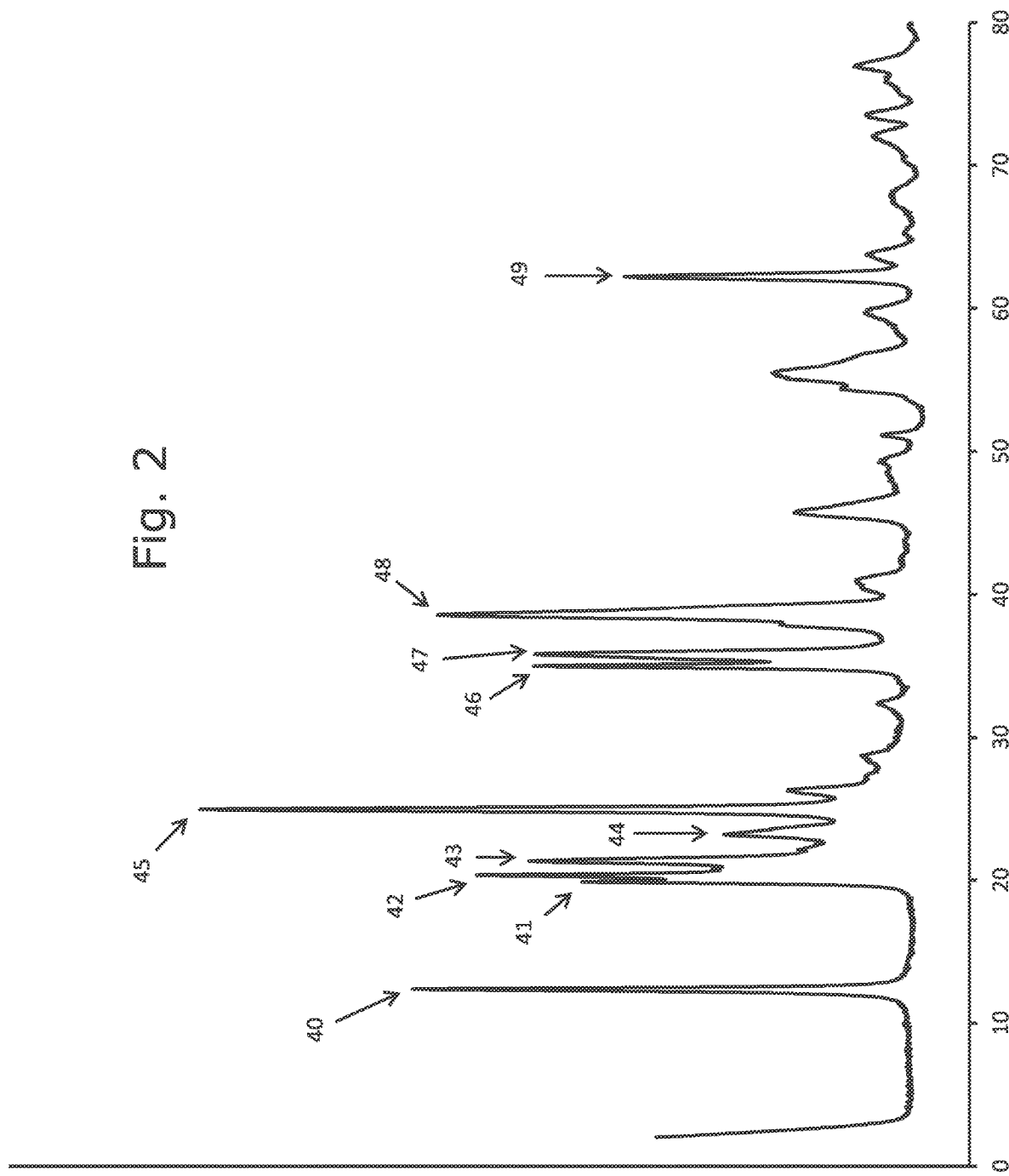
FIG. 2 is an X-ray diffractogram of a composition comprising a synthetic kaolinite according to the invention $(Al_2Si_2O_5(OH)_4)$ obtained following 24 h of hydrothermal treatment at 300° C.
Figure 5:
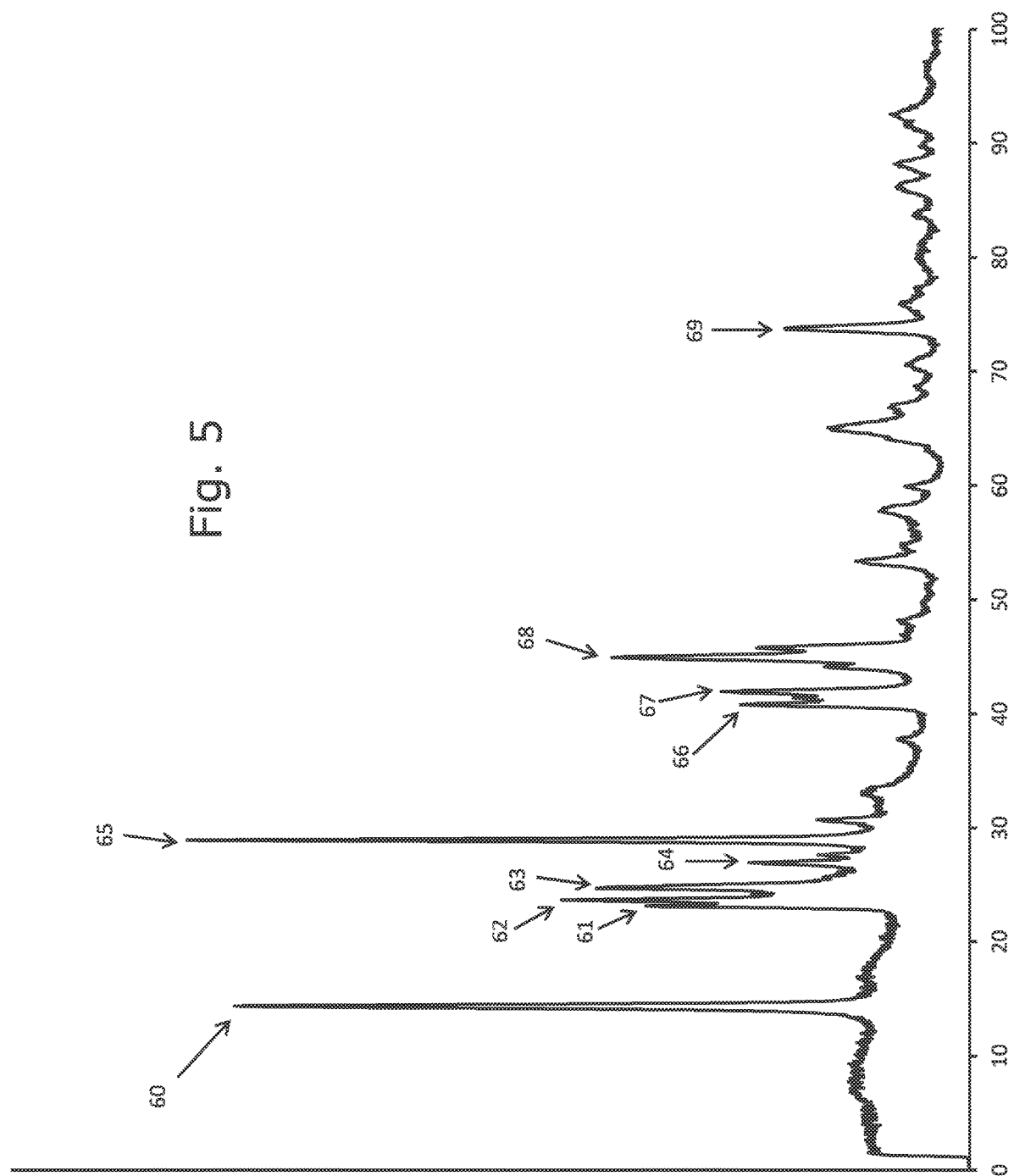
FIG. 5 is an X-ray diffractogram of a composition comprising a synthetic kaolinite according to the invention $(Al_2Si_2O_5(OH)_4)$ obtained following 96 h (4 days) of hydrothermal treatment at 300° C.

FIGS. 2 and 5 show X-ray diffractograms, each of which shows the relative signal intensity (number of hits per second) as a function of the interplanar distance in angstrom.

In X-ray diffraction, a composition according to the invention has at least one diffraction line characteristic of a plane (001) situated at a distance of 7.00 to 7.30 Å. Such a diffraction line is characteristic of kaolinites.

Figure 6:
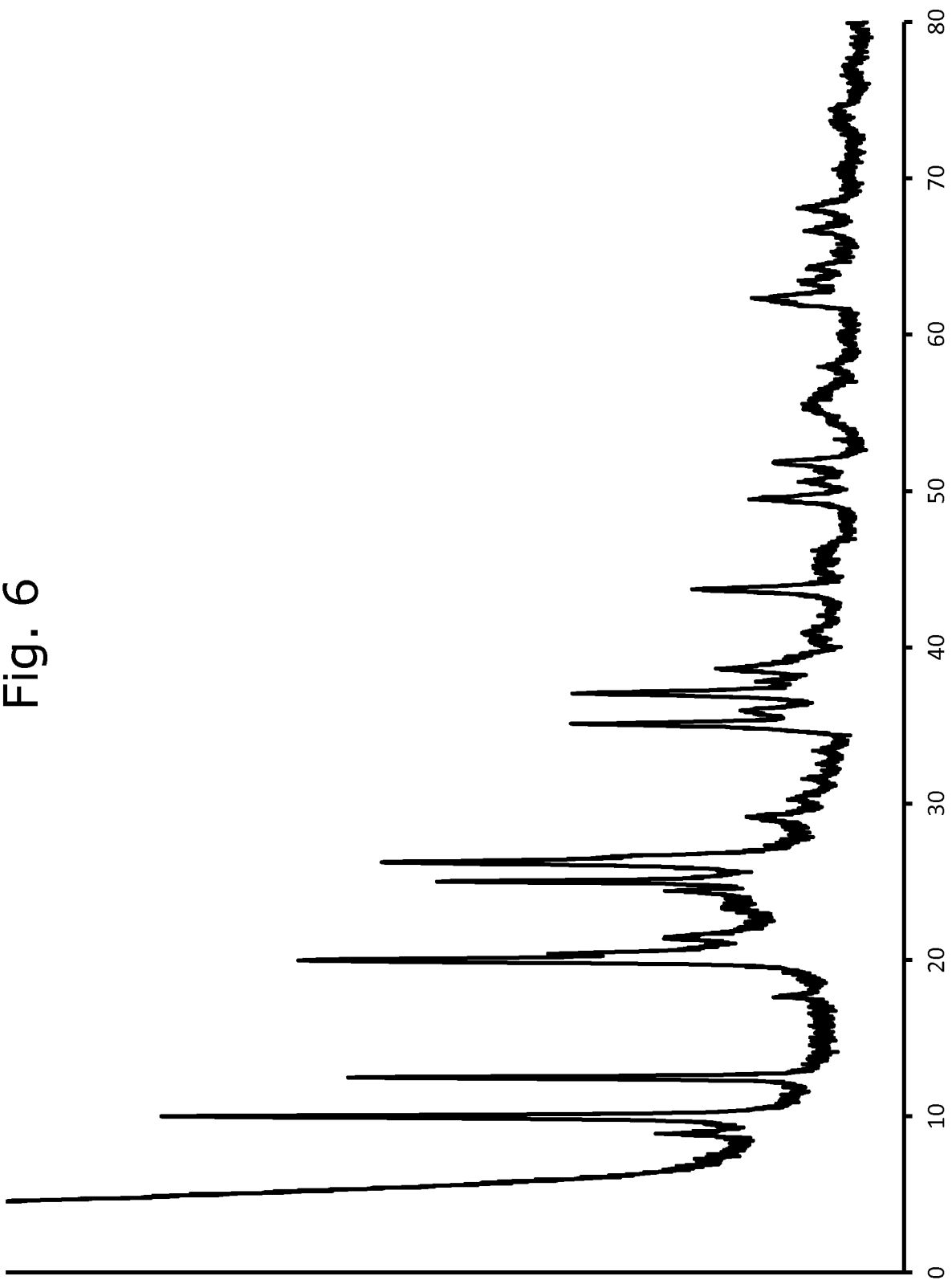
FIG. 6 is an X-ray diffractogram of a composition comprising a synthetic kaolinite according to the invention $(Al_2Si_2O_5(OH)_4)$ obtained following continuous hydrothermal treatment at 400° C.

FIGS. 2 and 5 respectively show the results of X-ray diffraction analyses carried out on:
  A composition comprising a synthetic kaolinite $Al_2Si_2O_5(OH)_4$ obtained following 24 h of hydrothermal treatment at 300° C. (FIG. 2),
  A composition comprising a synthetic kaolinite $Al_2Si_2O_5(OH)_4$ obtained following 96 h of hydrothermal treatment at 300° C. (FIG. 5),
  A composition comprising a synthetic kaolinite $Al_2Si_2O_5(OH)_4$ obtained following 30 min of continuous hydrothermal treatment at 400° C. (FIG. 6).

The X-ray diffractogram shown in FIG. 2 was recorded on a Panalytical MPDPro® diffractometer marketed by Panalytical® (Netherlands). This is a multi-configuration theta/theta diffractometer (transmission, reflection, variable temperature) equipped with a rapid linear detector. The Bragg relationship that gives the structural equidistance is: $d_{hkl}=0.7703/\sin\theta$ (using a copper anticathode).

The X-ray diffractogram shown in FIG. 5 was recorded on a CPS 120 device marketed by INEL (Artenay, France). This is a diffractometer with a curve detector that allows for real-time detection over an angular range of 120°. The acceleration voltage used is 40 kV, and the intensity is 25 mA. The Bragg relationship that gives the structural equidistance is: $d_{hkl}=0.89449/\sin\theta$ (using a cobalt anticathode).

2. Infrared Analysis

Figure 3:
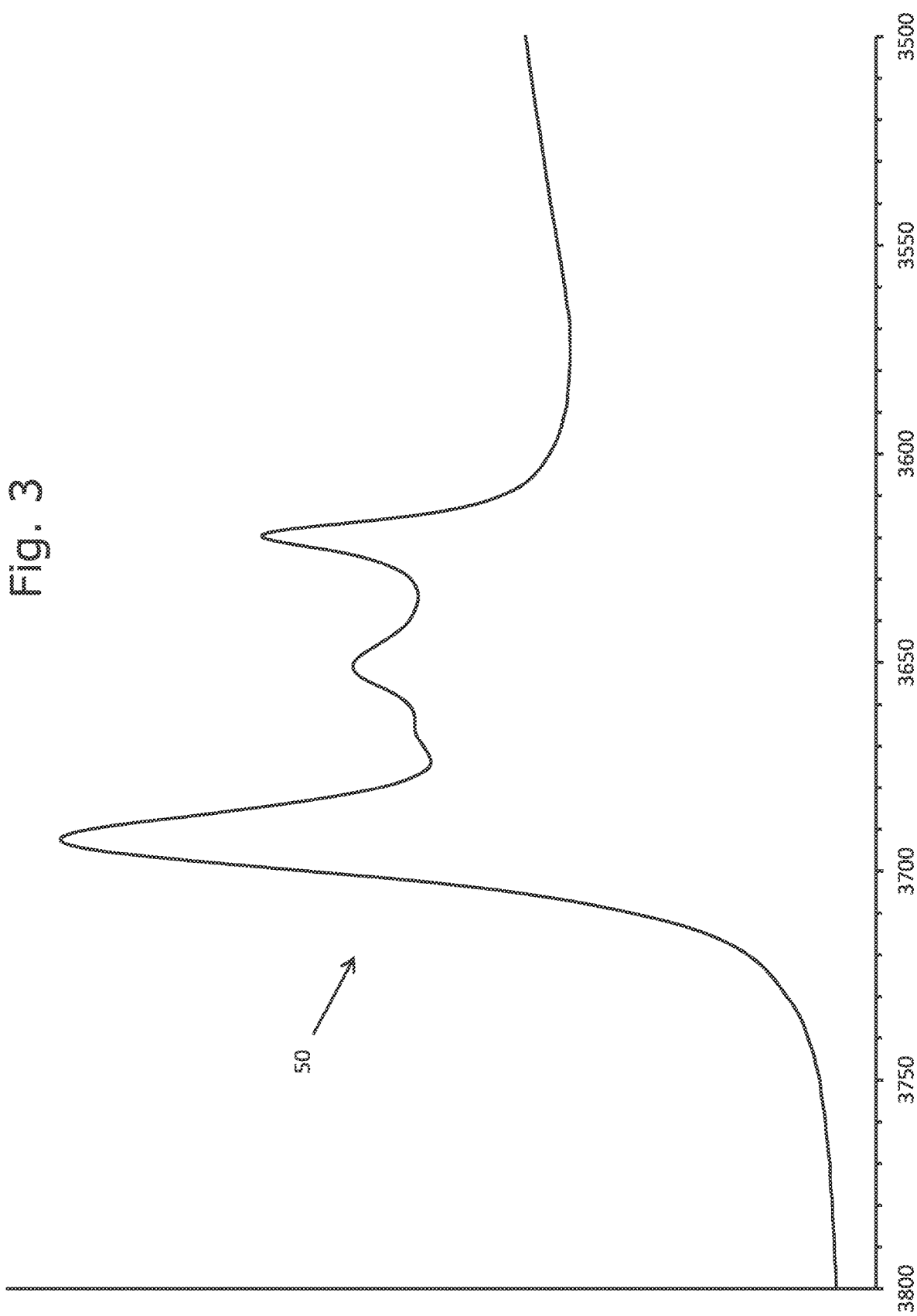
FIG. 3 is an infrared spectrum of a composition comprising a synthetic kaolinite according to the invention $(Al_2Si_2O_5(OH)_4)$ obtained following 24 h of hydrothermal treatment at 300° C.

FIG. 3 shows an infrared spectrum showing signal intensity as a function of wavelength expressed in $cm^{-1}$. FIG. 3 is the near infrared spectrum (curve 50) of a composition comprising a synthetic kaolinite according to the invention $(Al_2Si_2O_5(OH)_4)$ obtained following 24 h of hydrothermal treatment at 300° C.

The spectra obtained show four vibration bands between 3620 and 3700 $cm^{-1}$, which are representative of elongation vibrations of the hydroxyl groups (—OH) of a kaolinite.

These spectra were acquired with a NICOLET 6700-FTIR spectrometer over a range of 9000 to 4000 $cm^{-1}$.

3. Thermal Analyses

Figure 4:
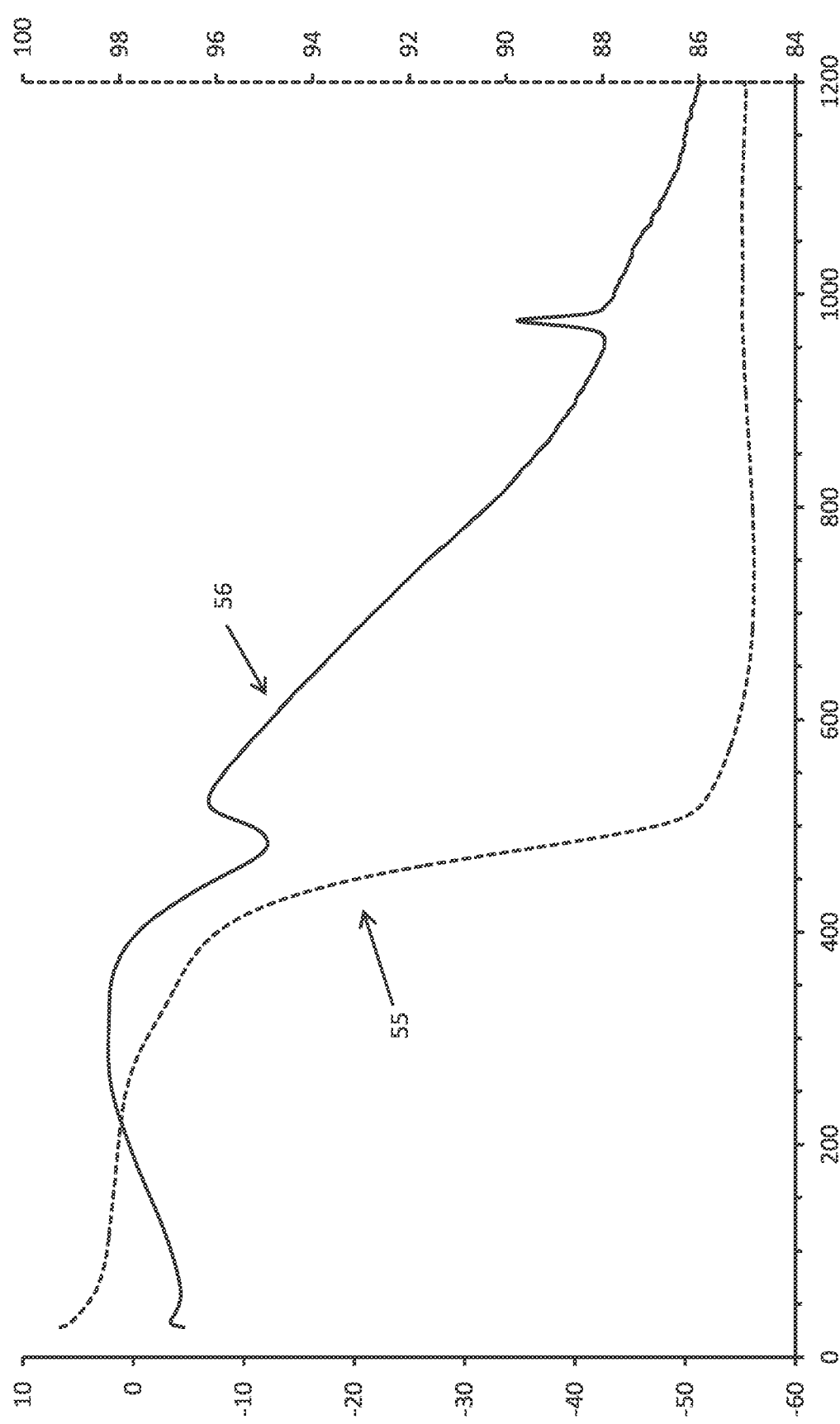
FIG. 4 shows thermograms obtained by thermogravimetric analysis (TGA) and differential thermal analysis (DTA) of a composition comprising a synthetic kaolinite according to the invention $(Al_2Si_2O_5(OH)_4)$ obtained following 24 h of hydrothermal treatment at 300° C.

FIG. 4 shows curves obtained by thermogravimetric analysis (TGA) (curve 55) and differential thermal analysis (DTA) (curve 56) of a composition comprising a synthetic kaolinite according to the invention $(Al_2Si_2O_5(OH)_4)$ obtained following 24 h of hydrothermal treatment at 300° C.

In FIG. 4, curve 56 (differential thermal analysis) represents the heat released or absorbed by the sample of the composition analysed (in mW on the ordinate axis on the left side of the thermogram) as a function of temperature (from 0 to 1200° C.). In FIG. 4, curve 55 (thermogravimetric analysis, dotted in FIG. 4) represents the variation in the mass of the sample of the composition analysed (in % on the ordinate axis on the right side of the thermogram) as a function of temperature (from 0 to 1200° C.).

The thermograms obtained are characteristic of kaolinites, with dehydroxylation starting from 400° C., and recrystallisation in spinel structure after 960° C. These transformation temperatures are slightly lower than those of a natural kaolinite, which is explained by the smaller size of the particles obtained.

The DTA and TGA analyses were carried out on a Diamond TG/TDA® thermobalance marketed by PERKIN ELMER® (USA) over a temperature range of 30 to 1000° C., in air, and with a heating rate of 10° C./min.

4. Microscopic Observations and Assessment of Particle Granulometry

Taking into account the great fineness of the powders that may constitute the compositions according to the invention, the size and granulometric distribution of the synthetic mineral particles of which they consist were assessed by scanning and field-effect electron microscopy.

It was found that the average size of the elementary particles varies between 20 and 600 nm, in particular between 20 and 500 nm.

The following examples illustrate the method of preparation according to the invention and the structure characteristics of the synthetic mineral particles thus obtained.

Example 1—Preparation of a Composition Comprising Synthetic Mineral Particles According to the Invention An aluminium nitrate solution is prepared with 37.51 g (0.1 mol) aluminium nitrate nonahydrate in 200 ml pure water.

A potassium metasilicate solution is also prepared from 29.67 g of an aqueous potassium metasilicate solution ($K_2SiO_3$) having a dry extract of 52% (i.e., 0.1 mol potassium metasilicate), 100 ml of potash (KOH) at 1M, and 200 ml of pure water.

The first aluminium nitrate solution is added with stirring to the potassium metasilicate solution, and a white precipitate forms instantaneously.

The suspension obtained is stirred for 5 min. Then, three cycles of washing with distilled water and centrifugation at 8000 RPM for 10 min are carried out for each new centrifugation. These successive washes with elimination of the supernatant after each centrifugation allow for the elimination of the potassium nitrate formed over the course of the precipitation reaction of the precursor gel.

Then, the precursor gel, placed in a closed titanium reactor placed in a furnace, is subjected to hydrothermal treatment at a temperature of 300° C. for 24 h under the saturation vapour pressure of the water in the reactor.

After cooling to RT, the reactor is opened, and the suspension obtained is centrifuged. After centrifugation, a composition comprising particles of the compound having the formula ($Al_2Si_2O_5(OH)_4$) is recovered.

The particle composition recovered following centrifugation is dried in a proofer (120° C., 12 h), then ground in a mortar. The composition obtained is in the form of a white powder.

The X-ray diffractogram of the composition of particles of the compound of the formula ($Al_2Si_2O_5(OH)_4$) thus obtained is shown in FIG. 2. The X-ray diffractogram of this composition shows the following characteristic diffraction lines:
- one plane (001) situated at a distance of 7.15 Å (line 40);
- one plane (020) situated at a distance of 4.46 Å (line 41);
- one plane (1$\bar{1}$0) situated at a distance of 4.37 Å (line 42);
- one plane (11$\bar{1}$) situated at a distance of 4.16 Å (line 43);
- one plane (02$\bar{1}$) situated at a distance of 3.80 Å (line 44);
- one plane (002) situated at a distance of 3.56 Å (line 45);
- one plane (1$\bar{3}$0) and one plane (201), situated at a distance of 2.56 Å (line 46);
- one plane (1$\bar{3}\bar{1}$) and one plane (200), situated at a distance of 2.50 Å (line 47);
- one plane (20$\bar{2}$) and one plane (1$\bar{3}$1), situated at a distance of 2.33 Å (line 48);
- one plane (060), one plane (33$\bar{1}$), and one plane (3$\bar{3}\bar{1}$), situated at a distance of 1.49 Å (line 49).

The infrared spectrum of the synthetic kaolinite composition obtained is shown in FIG. 3 (curve 50). It shows four vibration bands at 3620 cm$^{-1}$, 3651 cm$^{-1}$, 3667 cm$^{-1}$, and 3693 cm$^{-1}$, which are representative of elongation vibrations of the hydroxyl groups (—OH) of the synthetic kaolinite.

The curves obtained by TGA-DTA of the composition of particles of the compound of the formula ($Al_2Si_2O_5(OH)_4$) thus obtained are shown in FIG. 4. Such a thermogram is characteristic of kaolinites, with dehydroxylation starting from 400° C., and recrystallisation in spinel structure after 960° C. These transformation temperatures are slightly lower than those of a natural kaolinite, which is explained by the smaller size of the particles obtained.

One advantage of the particles obtained is that this transformation to a spinel structure around 975° C. (peak maximum), i.e., at a lower temperature than natural kaolinites, should, for example, allow for the manufacture of ceramics at a lower temperature, thus reducing the energy cost of the production of such ceramics.

Example 2—Preparation of a Composition Comprising Synthetic Mineral Particles According to the Invention An aluminium nitrate solution is prepared with 37.51 g (0.1 mol) aluminium nitrate nonahydrate in 200 ml pure water.

A solution of sodium metasilicate is also prepared with 21.21 g sodium metasilicate pentahydrate $Na_2SiO_3$, $5H_2O$ (0.1 mol) in 100 ml soda (1M) and 200 ml pure water.

The first aluminium nitrate solution is added with stirring to the sodium metasilicate solution, and a white precipitate forms instantaneously.

The suspension obtained is stirred for 5 min. Then, three cycles of washing with distilled water and centrifugation at 8000 RPM for 10 min are carried out for each centrifugation. These successive washes with elimination of the supernatant after each centrifugation allow for the elimination of the sodium nitrate formed over the course of the precipitation reaction of the precursor gel.

Then, the precursor gel, placed in a closed titanium reactor placed in a furnace, is subjected to hydrothermal treatment at a temperature of 300° C. for 96 h under the saturation vapour pressure of the water in the reactor.

After cooling to RT, the reactor is opened, and the suspension obtained is centrifuged. After centrifugation, a composition comprising synthetic mineral particles having the formula ($Al_2Si_2O_5(OH)_4$) is recovered.

The particle composition recovered following centrifugation is dried in a proofer (120° C., 12 h), then ground in a mortar. The composition obtained is in the form of a white powder.

The X-ray diffractogram of the composition of particles of the compound of the formula ($Al_2Si_2O_5(OH)_4$) thus obtained is shown in FIG. 5. The X-ray diffractogram of this composition shows the following characteristic diffraction lines:
- one plane (001) situated at a distance of 7.17 Å (line 60);
- one plane (020) situated at a distance of 4.46 Å (line 61);
- one plane (1$\bar{1}$0) situated at a distance of 4.38 Å (line 62);
- one plane (11$\bar{1}$) situated at a distance of 4.18 Å (line 63);
- one plane (02$\bar{1}$) situated at a distance of 3.78 Å (line 64);
- one plane (002) situated at a distance of 3.58 Å (line 65);
- one plane (1$\bar{3}$0) and one plane (20$\bar{1}$), situated at a distance of 2.57 Å (line 66);
- one plane (1$\bar{3}\bar{1}$) and one plane (200), situated at a distance of 2.50 Å (line 67);
- one plane (20$\bar{2}$) and one plane (1$\bar{3}$1), situated at a distance of 2.34 Å (line 68);
- one plane (060), one plane (33$\bar{1}$), and one plane (3$\bar{3}\bar{1}$), situated at a distance of 1.49 Å (line 69).

Example 3—Continuous Preparation of a Composition Comprising Synthetic Mineral Particles According to the Invention An aluminium nitrate solution is prepared with 37.51 g (0.1 mol) aluminium nitrate nonahydrate in 200 ml pure water.

A solution of sodium metasilicate is also prepared with 21.21 g sodium metasilicate pentahydrate $Na_2SiO_3$, $5H_2O$ (0.1 mol) in 100 ml soda (1M) and 200 ml pure water, to which 100 ml soda (1M) is added.

The first aluminium nitrate solution is added with stirring to the sodium metasilicate solution, and a white precipitate forms instantaneously.

The suspension obtained is stirred for 5 min. Then, three cycles of washing with distilled water and centrifugation at 8000 RPM for 10 min are carried out for each centrifugation. These successive washes with elimination of the supernatant after each centrifugation allow for the elimination of the sodium nitrate formed over the course of the precipitation reaction of the precursor gel.

The diluted precursor gel is then placed in 300 ml pure water in the reservoir 30 (cf. FIG. 1). Pure water that also allows for adjustment of the dilution of the precursor gel in the duct portion 13 is disposed in the reservoir 31.

The peristaltic pumps 18, 19 allow the two solutions to be separately passed through steel ducts having an external diameter of ⅛ inch (3.175 mm) and an internal diameter of 1.57 mm. The temperature in the enclosure 16 is 400° C., and the pressure in the reaction duct 14 is maintained (using the pressure regulator 2) above 22.1 MPa (between 25 and 27 MPa), such that the reaction medium circulating in the reaction duct 14 in the enclosure 16 is in conditions greater than the critical point of water (374° C., 221 bar).

Thus, the precursor gel undergoes hydrothermal treatment in the reaction enclosure 16, allowing the precursor gel to be transformed into a suspension of synthetic mineral particles of formula $(Al_2Si_2O_5(OH)_4)$. The residence time in the reaction duct 14 between the inlet 9 and the outlet 8 is 30 min.

After cooling, the suspension exiting the outlet 8 of the reactor 15 is a colloidal suspension of synthetic mineral particles of the formula $(Al_2Si_2O_5(OH)_4)$. It has the appearance of a milky white composition that decants in several tens of minutes. This suspension is subjected to a cycle of centrifugation (10 min at 8000 RPM). After centrifugation, on the one hand, a composition comprising synthetic mineral particles of the formula $(Al_2Si_2O_5(OH)_4)$, and, on the other, an aqueous supernatant solution, are obtained.

The particle composition recovered following centrifugation is dried in a proofer (120° C., 12 h), then ground in a mortar. The composition obtained is in the form of a white powder.

The X-ray diffractogram of the composition of particles of the compound of the formula $(Al_2Si_2O_5(OH)_4)$ thus obtained is shown in FIG. 6. The X-ray diffractogram of this composition shows the following characteristic diffraction lines:
- one plane (001) situated at a distance of 7.09 Å;
- one plane (020) situated at a distance of 4.44 Å;
- one plane (11$\bar{1}$) situated at a distance of 4.13 Å;
- one plane (002) situated at a distance of 3.56 Å;
- one plane (1$\bar{3}$0) and one plane (20$\bar{1}$), situated at a distance of 2.55 Å;
- one plane (1$\bar{3}$1) and one plane (200), situated at a distance of 2.49 Å;
- one plane (20$\bar{2}$) and one plane (1$\bar{3}$1), situated at a distance of 2.33 Å;
- one plane (060), one plane (33$\bar{1}$), and one plane (3$\bar{3}\bar{1}$), situated at a distance of 1.49 Å.

Numerous embodiments of the invention are possible. In particular, it is possible to prepare other compounds than those exemplified and corresponding to formula (I), with the silicon being replaced in whole or in part by germanium, or using iron or gallium instead of aluminium.

The invention claimed is:

1. A method for preparing synthetic mineral particles of the following formula (I):

$$(Al_yM_{1-y})_2(Si_xGe_{1-x})_2O_5(OH)_4 \quad (I)$$

wherein
Al is aluminium,
Si is silicon,
M is at least one trivalent metal selected from the group consisting of gallium, iron, and the rare earth elements,
y is a real number between 0 and 1,
Ge is germanium,
x is a real number between 0 and 1,
O is oxygen, and
H is hydrogen,
said method comprising:
providing a precursor gel of the synthetic mineral particles of formula (I) that is prepared by a co-precipitation reaction between:
at least one salt of a metal selected from the group consisting of aluminium and M,
at least one source of at least one chemical element selected from the group consisting of silicon and germanium, said source of the chemical element selected from the group consisting of silicon and germanium being selected from the group consisting of potassium metasilicate, sodium metasilicate, potassium metagermanate, and sodium metagermanate,
the molar ratio of $(Al_yM_{1-y})/(Si_xGe_{1-x})$ over the course of the preparation of the precursor gel being equal to 1,
at least one base being added over the course of the co-precipitation reaction; and
subjecting said precursor gel to continuous solvothermal treatment at a temperature between 250 and 600° C. for a period selected so as to allow synthetic mineral particles of formula (I) to be obtained,
wherein said solvothermal treatment is carried out for a period of less than 6 hours
in a continuous piston-flow reactor;
wherein the concentration of the precursor gel is less than or equal to 0.1 mol/L; and
wherein the synthetic mineral particles of formula (I) obtained by the method have an average size of between 20 nm and 600 nm.

2. The method according to claim 1, wherein said aluminium salt is selected from the group consisting of aluminium chloride and aluminium nitrate.

3. The method according to claim 1, wherein said solvothermal treatment is carried out using a constant-volume continuous reactor.

4. The method according to claim 1, wherein said solvothermal treatment is carried out in an aqueous medium.

5. The method according to claim 1, wherein said solvothermal treatment is carried out at a pressure greater than 1 MPa.

6. The method according to claim 1, wherein said solvothermal treatment is carried out at a pressure between 22 and 30 MPa.

7. The method according to claim 1, wherein the duration of said solvothermal treatment is greater than 10 seconds and less than 6 hours.

8. The method according to claim 1, wherein said precursor gel is washed at least once prior to said solvothermal treatment.

9. The method according to claim 1, wherein said base is selected from the group consisting of NaOH and KOH.

10. A method for preparing synthetic mineral particles of the following formula (I):

$$(Al_yM_{1-y})_2(Si_xGe_{1-x})_2O_5(OH)_4 \qquad (I)$$

wherein
Al is aluminium,
Si is silicon,
M is at least one trivalent metal selected from the group consisting of gallium, iron, and the rare earth elements,
y is a real number between 0 and 1,
Ge is germanium,
x is a real number between 0 and 1,
O is oxygen, and
H is hydrogen,
said method comprising:
  providing a precursor gel of the synthetic mineral particles of formula (I) that is prepared by a co-precipitation reaction between:
    at least one salt of a metal selected from the group consisting of aluminium and M,
    at least one source of at least one chemical element selected from the group consisting of silicon and germanium, said source of the chemical element selected from the group consisting of silicon and germanium being selected from the group consisting of potassium metasilicate, sodium metasilicate, potassium metagermanate, and sodium metagermanate,
    the molar ratio of $(Al_yM_{1-y})/(Si_xGe_{1-x})$ over the course of the preparation of the precursor gel being equal to 1,
    at least one base being added over the course of the co-precipitation reaction; and
  subjecting said precursor gel to continuous solvothermal treatment at a temperature between 250 and 600° C. for a period selected so as to allow synthetic mineral particles of formula (I) to be obtained,
wherein said solvothermal treatment is carried out for a period of less than 6 hours in a continuous plug-flow reactor;
wherein the concentration of the precursor gel is of less than or equal to 0.1 mol/L; and
wherein the synthetic mineral particles of formula (I) obtained by the method have an average size of between 20 nm and 600 nm.

* * * * *